US011953896B2

United States Patent
Lepird et al.

(10) Patent No.: US 11,953,896 B2
(45) Date of Patent: Apr. 9, 2024

(54) SYSTEM AND METHOD FOR A MODULAR AND CONTINUALLY LEARNING REMOTE GUIDANCE SYSTEM FOR AUTONOMOUS VEHICLES

(71) Applicant: Argo AI, LLC, Pittsburgh, PA (US)

(72) Inventors: John Russell Lepird, Pittsburgh, PA (US); Artem Churkin, Munich (DE)

(73) Assignee: Argo AI, LLC, Pittsburgh, PA (US)

( * ) Notice: Subject to any disclaimer, the term of this patent is extended or adjusted under 35 U.S.C. 154(b) by 373 days.

(21) Appl. No.: 17/175,814

(22) Filed: Feb. 15, 2021

(65) Prior Publication Data
US 2022/0260989 A1    Aug. 18, 2022

(51) Int. Cl.
G05D 1/00 (2006.01)
B60W 50/02 (2012.01)
B60W 50/06 (2006.01)
B60W 60/00 (2020.01)

(52) U.S. Cl.
CPC ....... G05D 1/0011 (2013.01); B60W 50/0205 (2013.01); B60W 50/06 (2013.01); B60W 60/001 (2020.02); B60W 2420/42 (2013.01); B60W 2420/52 (2013.01); B60W 2556/45 (2020.02)

(58) Field of Classification Search
CPC ......... G05D 1/0011; G05D 2201/0213; B60W 50/0205; B60W 50/06; B60W 60/001; B60W 2420/42; B60W 2420/52; B60W 2556/45
See application file for complete search history.

(56) References Cited

U.S. PATENT DOCUMENTS

| | | | |
|---|---|---|---|
| 9,566,986 B1 * | 2/2017 | Gordon | G05D 1/0061 |
| 10,019,011 B1 | 7/2018 | Green et al. | |
| 10,699,141 B2 | 6/2020 | Dean et al. | |
| 10,968,855 B2 | 4/2021 | Kitagawa et al. | |
| 2018/0105165 A1 | 4/2018 | Alarcon et al. | |
| 2018/0261100 A1 | 9/2018 | Rachmawati | |
| 2019/0171202 A1 | 6/2019 | Fairfield et al. | |

(Continued)

FOREIGN PATENT DOCUMENTS

| | | | | |
|---|---|---|---|---|
| DE | 10334536 A1 * | 2/2004 | | B60G 17/0195 |
| DE | 102017116351 A1 * | 1/2018 | | G01C 15/002 |
| EP | 3376451 A1 | 3/2018 | | |

(Continued)

*Primary Examiner* — Aniss Chad
*Assistant Examiner* — Christine Nguyen Huynh
(74) *Attorney, Agent, or Firm* — The Webb Law Firm

(57) ABSTRACT

Systems, methods, and autonomous vehicles may obtain sensor data associated with an environment surrounding an autonomous vehicle; provide the sensor data to a plurality of plugins; independently determine, with each plugin, based on the sensor data, whether to request a remote guidance session for the autonomous vehicle, each plugin of the plurality of plugins including a different model that is applied by that plugin to the sensor data to determine whether to request the remote guidance session; receive, from at least one plugin, a request to initiate the remote guidance session; and in response to receiving the request to initiate the remote guidance session, communicate with a computing device external to the autonomous vehicle to establish the remote guidance session.

16 Claims, 6 Drawing Sheets

(56) References Cited

U.S. PATENT DOCUMENTS

2021/0116907 A1    4/2021  Altman
2022/0089181 A1*   3/2022  Gross .................... B64C 39/024

FOREIGN PATENT DOCUMENTS

| JP | 202067911 A | 4/2020 |
| KR | 1020200132952 A | 11/2020 |
| WO | 2020005918 A1 | 1/2020 |

* cited by examiner

SYSTEM AND METHOD FOR A MODULAR AND CONTINUALLY LEARNING REMOTE GUIDANCE SYSTEM FOR AUTONOMOUS VEHICLES

BACKGROUND

1. Field

This disclosure relates generally to remote guidance systems for autonomous vehicles and, in some non-limiting embodiments or aspects, to a modular and continually learning remote guidance system for autonomous vehicles.

2. Technical Considerations

Autonomous vehicles may have a capability to call for remote guidance. For example, a call for remote guidance from an autonomous vehicle may trigger a human operator at a different location than the autonomous vehicle to monitor the scene surrounding the autonomous vehicle and/or take control of the autonomous vehicle. However, existing software logic for triggering a call to remote guidance is complex, difficult to extend, and does not have a clear path to continual improvement beyond anecdotal bug reports.

SUMMARY

Accordingly, provided are improved systems, methods, products, apparatuses, and/or devices for triggering or initiating remote guidance for autonomous vehicles.

According to some non-limiting embodiments or aspects, provided is a computer-implemented method, system, and autonomous vehicle that obtain sensor data associated with an environment surrounding an autonomous vehicle; provide the sensor data to a plurality of plugins; independently determine, with each plugin of the plurality of plugins, based on the sensor data, whether to request a remote guidance session for the autonomous vehicle, each plugin of the plurality of plugins including a different model that is applied by that plugin to the sensor data to determine whether to request the remote guidance session; receive, from at least one plugin of the plurality of plugins, a request to initiate the remote guidance session for the autonomous vehicle; and in response to receiving the request to initiate the remote guidance session, communicate with a computing device external to the autonomous vehicle to establish the remote guidance session with the computing device, the remote guidance session providing, via the computing device, a human operator with information associated with the environment surrounding the autonomous vehicle and an ability to control at least one driving operation of the autonomous vehicle.

Further embodiments or aspects are set forth in the following numbered clauses:

Clause 1. A computer-implemented method comprising: obtaining sensor data associated with an environment surrounding an autonomous vehicle; providing the sensor data to a plurality of plugins; independently determining, with each plugin of the plurality of plugins, based on the sensor data, whether to request a remote guidance session for the autonomous vehicle, wherein each plugin of the plurality of plugins includes a different model that is applied by that plugin to the sensor data to determine whether to request the remote guidance session; receiving, from at least one plugin of the plurality of plugins, a request to initiate the remote guidance session for the autonomous vehicle; and in response to receiving the request to initiate the remote guidance session, communicating with a computing device external to the autonomous vehicle to establish the remote guidance session with the computing device, wherein the remote guidance session provides, via the computing device, a human operator with information associated with the environment surrounding the autonomous vehicle and an ability to control at least one driving operation of the autonomous vehicle.

Clause 2. The computer-implemented method of clause 1, further comprising: obtaining, from the human operator, via the computing device, feedback data associated with the remote guidance session; and updating, based on the feedback data, the model included in the at least one plugin from which the request to initiate the remote guidance session is received.

Clause 3. The computer-implemented method of clauses 1 or 2, wherein the model included in the at least one plugin from which the request to initiate the remote guidance session is received includes at least one of the following models: a threshold model, a heuristic model, a machine learning model, a neural network model, or any combination thereof.

Clause 4. The computer-implemented method of any of clauses 1-3, wherein the at least one plugin from which the request to initiate the remote guidance session is received includes two or more plugins of the plurality of plugins, wherein the feedback data includes first feedback data associated with a first plugin of the two or more plugins and second feedback data associated with a second plugin of the two or more plugins, and wherein the method further comprises: updating, based on the first feedback data, a first model included in the first plugin of the two or more plugins; and updating, based on the second feedback data, a second model included in the second plugin of the two or more plugins.

Clause 5. The computer-implemented method of any of clauses 1-4, wherein the remote guidance session provides, via the computing device, the human operator with an indication of an autonomy anomaly case associated with the at least one plugin from which the request to initiate the remote guidance session is received.

Clause 6. The computer-implemented method of any of clauses 1-5, further comprising: receiving, from the computing device external to the autonomous vehicle, during the remote guidance session, remote guidance data; and controlling, based on the remote guidance data, during the remote guidance session, the at least one driving operation of the autonomous vehicle.

Clause 7. A system comprising: one or more processors programmed and/or configured to: obtain sensor data associated with an environment surrounding an autonomous vehicle; provide the sensor data to a plurality of plugins; independently determine, with each plugin of the plurality of plugins, based on the sensor data, whether to request a remote guidance session for the autonomous vehicle, wherein each plugin of the plurality of plugins includes a different model that is applied by that plugin to the sensor data to determine whether to request the remote guidance session; receive, from at least one plugin of the plurality of plugins, a request to initiate the remote guidance session for the autonomous vehicle; and in response to receiving the request to initiate the remote guidance session, communicate with a computing device external to the autonomous vehicle to establish the remote guidance session with the computing device, wherein the remote guidance session provides, via the computing device, a human operator with information associated with the environment surrounding the autonomous vehicle and an ability to control at least one driving operation of the autonomous vehicle.

Clause 8. The system of clause 7, wherein the one or more processors are further programmed and/or configured to: obtain, from the human operator, via the computing device, feedback data associated with the remote guidance session; and update, based on the feedback data, the model included in the at least one plugin from which the request to initiate the remote guidance session is received.

Clause 9. The system of clauses 7 or 8, wherein the model included in the at least one plugin from which the request to initiate the remote guidance session is received includes at least one of the following models: a threshold model, a heuristic model, a machine learning model, a neural network model, or any combination thereof.

Clause 10. The system of any of clauses 7-9, wherein the at least one plugin from which the request to initiate the remote guidance session is received includes two or more plugins of the plurality of plugins, wherein the feedback data includes first feedback data associated with a first plugin of the two or more plugins and second feedback data associated with a second plugin of the two or more plugins, and wherein the one or more processors are further programmed and/or configured to: update, based on the first feedback data, a first model included in the first plugin of the two or more plugins; and update, based on the second feedback data, a second model included in the second plugin of the two or more plugins.

Clause 11. The system of any of clauses 7-10, wherein the remote guidance session provides, via the computing device, the human operator with an indication of an autonomy anomaly case associated with the at least one plugin from which the request to initiate the remote guidance session is received.

Clause 12. The system of any of clauses 7-11, wherein the one or more processors are further programmed and/or configured to: receive, from the computing device external to the autonomous vehicle, during the remote guidance session, remote guidance data; and control, based on the remote guidance data, during the remote guidance session, the at least one driving operation of the autonomous vehicle.

Clause 13. The system of any of clauses 7-12, further comprising: the computing device external to the autonomous vehicle, wherein the computing device external to the autonomous vehicle is programmed and/or configured to: provide a user interface that provides the information associated with the environment surrounding the autonomous vehicle and the ability to control at least one driving operation of the autonomous vehicle.

Clause 14. An autonomous vehicle comprising: one or more sensors configured to determine sensor data associated with an environment surrounding the autonomous vehicle; a computing device programmed and/or configured to: obtain the sensor data associated with the environment surrounding an autonomous vehicle; provide the sensor data to a plurality of plugins; independently determine, with each plugin of the plurality of plugins, based on the sensor data, whether to request a remote guidance session for the autonomous vehicle, wherein each plugin of the plurality of plugins includes a different model that is applied by that plugin to the sensor data to determine whether to request the remote guidance session; receive, from at least one plugin of the plurality of plugins, a request to initiate the remote guidance session for the autonomous vehicle; and in response to receiving the request to initiate the remote guidance session, communicate with a computing device external to the autonomous vehicle to establish the remote guidance session with the computing device, wherein the remote guidance session provides, via the computing device, a human operator with information associated with the environment surrounding the autonomous vehicle and an ability to control at least one driving operation of the autonomous vehicle.

Clause 15. The autonomous vehicle of clause 14, wherein the computing system is further programmed and/or configured to: obtain, from the human operator, via the computing device, feedback data associated with the remote guidance session; and update, based on the feedback data, the model included in the at least one plugin from which the request to initiate the remote guidance session is received.

Clause 16. The autonomous vehicle of clauses 14 or 15, wherein the model included in the at least one plugin from which the request to initiate the remote guidance session is received includes at least one of the following models: a threshold model, a heuristic model, a machine learning model, a neural network model, or any combination thereof.

Clause 17. The autonomous vehicle of any of clauses 14-16, wherein the at least one plugin from which the request to initiate the remote guidance session is received includes two or more plugins of the plurality of plugins, wherein the feedback data includes first feedback data associated with a first plugin of the two or more plugins and second feedback data associated with a second plugin of the two or more plugins, and wherein the computing system is further programmed and/or configured to: update, based on the first feedback data, a first model included in the first plugin of the two or more plugins; and update, based on the second feedback data, a second model included in the second plugin of the two or more plugins.

Clause 18. The autonomous vehicle of any of clauses 14-17, wherein the remote guidance session provides, via the computing device, the human operator with an indication of an autonomy anomaly case associated with the at least one plugin from which the request to initiate the remote guidance session is received.

Clause 19. The autonomous vehicle of any of clauses 14-18, wherein the computing system is further programmed and/or configured to: receive, from the computing device external to the autonomous vehicle, during the remote guidance session, remote guidance data; and control, based on the remote guidance data, during the remote guidance session, the at least one driving operation of the autonomous vehicle.

BRIEF DESCRIPTION OF THE DRAWINGS

Additional advantages and details are explained in greater detail below with reference to the exemplary embodiments that are illustrated in the accompanying schematic figures, in which.

DESCRIPTION

Figure 1:
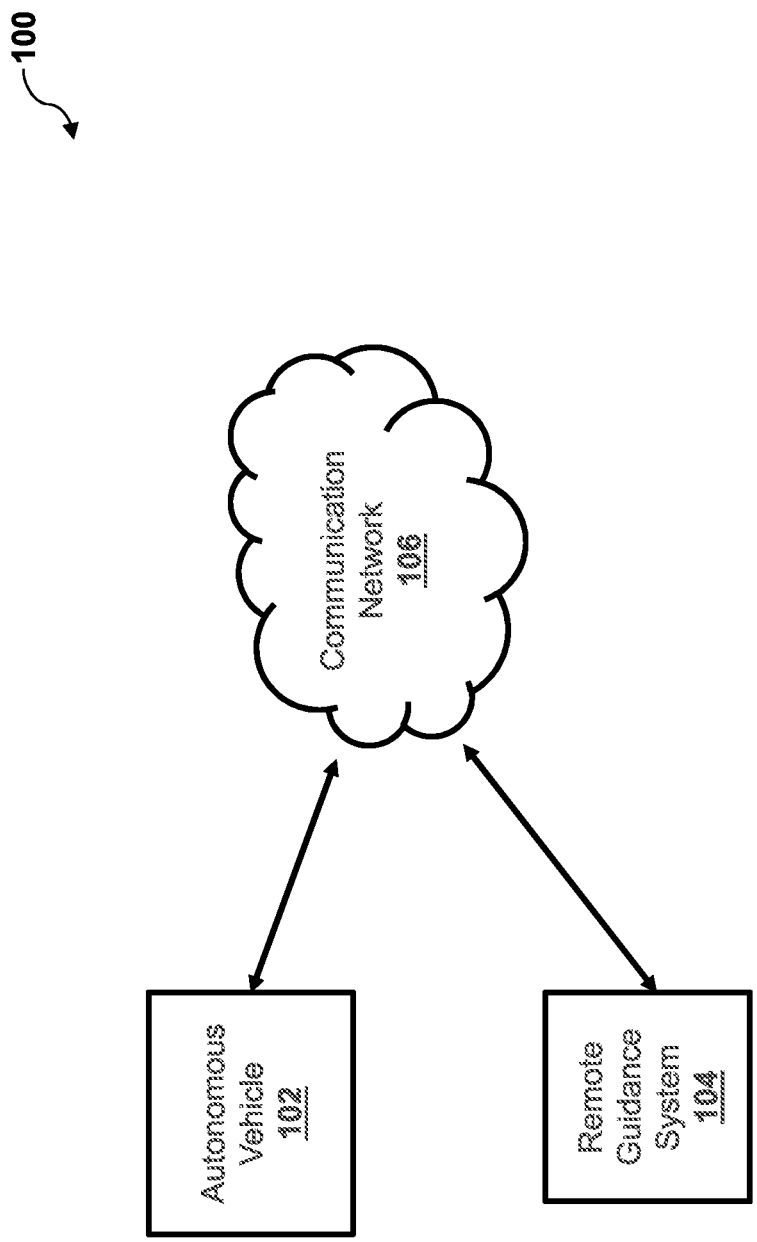
FIG. 1 is a diagram of non-limiting embodiments or aspects of an environment in which systems, methods, products, apparatuses, and/or devices, described herein, may be implemented.

It is to be understood that the present disclosure may assume various alternative variations and step sequences, except where expressly specified to the contrary. It is also to be understood that the specific devices and processes illustrated in the attached drawings, and described in the following specification, are simply exemplary and non-limiting embodiments or aspects. Hence, specific dimensions and other physical characteristics related to the embodiments or aspects disclosed herein are not to be considered as limiting.

No aspect, component, element, structure, act, step, function, instruction, and/or the like used herein should be construed as critical or essential unless explicitly described as such. Also, as used herein, the articles "a" and "an" are intended to include one or more items, and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the term "communication" may refer to the reception, receipt, transmission, transfer, provision, and/or the like, of data (e.g., information, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit processes information received from the first unit and communicates the processed information to the second unit.

It will be apparent that systems and/or methods, described herein, can be implemented in different forms of hardware, software, or a combination of hardware and software. The actual specialized control hardware or software code used to implement these systems and/or methods is not limiting of the implementations. Thus, the operation and behavior of the systems and/or methods are described herein without reference to specific software code, it being understood that software and hardware can be designed to implement the systems and/or methods based on the description herein.

Some non-limiting embodiments or aspects are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" is a vehicle having a processor, programming instructions and drivetrain components that are controllable by the processor without requiring a human operator. An autonomous vehicle may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle.

As used herein, the term "computing device" may refer to one or more electronic devices configured to process data. A computing device may, in some examples, include the necessary components to receive, process, and output data, such as a processor, a display, a memory, an input device, a network interface, and/or the like. A computing device may be a mobile device. As an example, a mobile device may include a cellular phone (e.g., a smartphone or standard cellular phone), a portable computer, a wearable device (e.g., watches, glasses, lenses, clothing, and/or the like), a PDA, and/or other like devices. A computing device may also be a desktop computer or other form of non-mobile computer.

As used herein, the term "server" and/or "processor" may refer to or include one or more computing devices that are operated by or facilitate communication and processing for multiple parties in a network environment, such as the Internet, although it will be appreciated that communication may be facilitated over one or more public or private network environments and that various other arrangements are possible. Further, multiple computing devices (e.g., servers, POS devices, mobile devices, etc.) directly or indirectly communicating in the network environment may constitute a "system." Reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

As used herein, the term "user interface" or "graphical user interface" may refer to a generated display, such as one or more graphical user interfaces (GUIs) with which a user may interact, either directly or indirectly (e.g., through a keyboard, mouse, touchscreen, etc.).

Existing systems for initiating a remote guidance session (e.g., for determining when to trigger a remote guidance call, etc.) use monolithic or ad hoc designs that are complex, difficult to extend, and do not have a clear path to continual improvement beyond anecdotal bug reports. For example, existing systems may use a monolithic application or control system (e.g., a single-tiered software application in which the user interface and data access code are combined into a single program from a single platform), may be self-contained and independent from other computing applications, to determine whether a situation or scenario for which a call to remote guidance should be initiated exists. In this way, it is more complex and difficult to modify an existing system to address new situations and/or scenarios, and it is more difficult to assess and/or improve the performance of the existing system with respect to specific situations or scenarios.

Non-limiting embodiments or aspects of the present disclosure provide for systems, methods, and autonomous vehicles that obtain sensor data associated with an environment surrounding an autonomous vehicle; provide the sensor data to a plurality of plugins; independently determine, with each plugin of the plurality of plugins, based on the sensor data, whether to request a remote guidance session for the autonomous vehicle, each plugin of the plurality of plugins including a different model that is applied by that plugin to the sensor data to determine whether to request the remote guidance session; receive, from at least one plugin of the plurality of plugins, a request to initiate the remote guidance session for the autonomous vehicle; and in response to receiving the request to initiate the remote guidance session, communicate with a computing device external to the autonomous vehicle to establish the remote guidance session with the computing device, the remote guidance session providing, via the computing device, a human operator with information associated with the environment surrounding the autonomous vehicle and an ability to control at least one driving operation of the autonomous vehicle. Non-limiting embodiments or aspects of the present disclosure also provide for obtaining, from the human operator, via the computing device, feedback data associated with the remote guidance session; and updating, based on the feedback data, the model included in the at least one plugin from which the request to initiate the remote guidance session is received.

In this way, non-limiting embodiments or aspects of the present disclosure provide for a modular structure that delegates the decision to call remote guidance to an ensemble of independent and modular plugins and a feedback loop that includes a continuous source of labelled, real-world data that enables data-driven models in the modular plugins to independently and automatically learn and continue to improve the performance of the plugins. Accordingly, non-limiting embodiments or aspects of the present disclosure enable developers to independently add targeted plugins including heuristic and/or data-driven logic or models to address specific autonomy anomalies and to obtain more clear statistics about the independent performance of these plugins. For example, instead of attempting to address a single global feasibility problem of knowing when to call remote guidance, developers may instead address a scalability problem of how can plugins be added to mitigate specific situations or autonomy anomalies, and how can these plugins be continually improved to drive down false positives, thereby enabling multiple plugins to be developed and/or added in parallel and reducing a complexity of engineering maintenance and improvement of the system.

Referring now to FIG. 1, FIG. 1 is a diagram of an example environment 100 in which systems, methods, products, apparatuses, and/or devices described herein, may be implemented. As shown in FIG. 1, environment 100 may include autonomous vehicle 102, remote guidance system 104, and/or communication network 106.

Autonomous vehicle 102 may include one or more devices capable of receiving information and/or data from remote guidance system 104 via communication network 106 and/or communicating information and/or data to remote guidance system 104 via communication network 106. For example, autonomous vehicle 102 may include a computing device, such as a server, a group of servers, a mobile device, and/or other like devices.

Remote guidance system 104 may include one or more devices capable of receiving information and/or data from autonomous vehicle 102 via communication network 106 and/or communicating information and/or data to autonomous vehicle 102 via communication network 106. For example, remote guidance system 104 may include a computing device, such as a server, a group of servers, a mobile device, and/or other like devices. In some non-limiting embodiments or aspects, remote guidance system 104 may be located external to and at a location separate from autonomous vehicle 102.

Communication network 106 may include one or more wired and/or wireless networks. For example, communication network 106 may include a cellular network (e.g., a long-term evolution (LTE) network, a third generation (3G) network, a fourth generation (4G) network, a fifth generation (5G) network a code division multiple access (CDMA) network, etc.), a public land mobile network (PLMN), a local area network (LAN), a wide area network (WAN), a metropolitan area network (MAN), a telephone network (e.g., the public switched telephone network (PSTN)), a private network, an ad hoc network, an intranet, the Internet, a fiber optic-based network, a cloud computing network, and/or the like, and/or a combination of these or other types of networks.

The number and arrangement of devices and systems shown in FIG. 1 is provided as an example. There may be additional devices and/or systems, fewer devices and/or systems, different devices and/or systems, or differently arranged devices and/or systems than those shown in FIG. 1. Furthermore, two or more devices and/or systems shown in FIG. 1 may be implemented within a single device and/or system, or a single device and/or system shown in FIG. 1 may be implemented as multiple, distributed devices and/or systems. Additionally, or alternatively, a set of devices and/or systems (e.g., one or more devices or systems) of environment 100 may perform one or more functions described as being performed by another set of devices and/or systems of environment 100. For example, while FIG. 1 illustrates remote guidance system 104 as being located external to and at a location separate from autonomous vehicle 102, in other non-limiting embodiments or aspects, remote guidance system 104 may be on-board autonomous vehicle 102, such as within an on-board computing device. For example, remote guidance system 104 may be on-board autonomous vehicle 102 and contained within hardware and/or software components of autonomous vehicle 102 (or an ancillary computing device, such as a computing device (e.g., laptop) that is permanently or temporarily within autonomous vehicle 102) that may be separate from the hardware and/or software components of autonomous vehicle 102 that contain the plurality of plugins that are configured to independently determine whether to request a remote guidance session for the autonomous vehicle 102. In such a configuration, a human operator positioned within autonomous vehicle 102 may interact with remote guidance system 104 through one or more interfaces of autonomous vehicle 102 and/or ancillary computing device.

Figure 2:
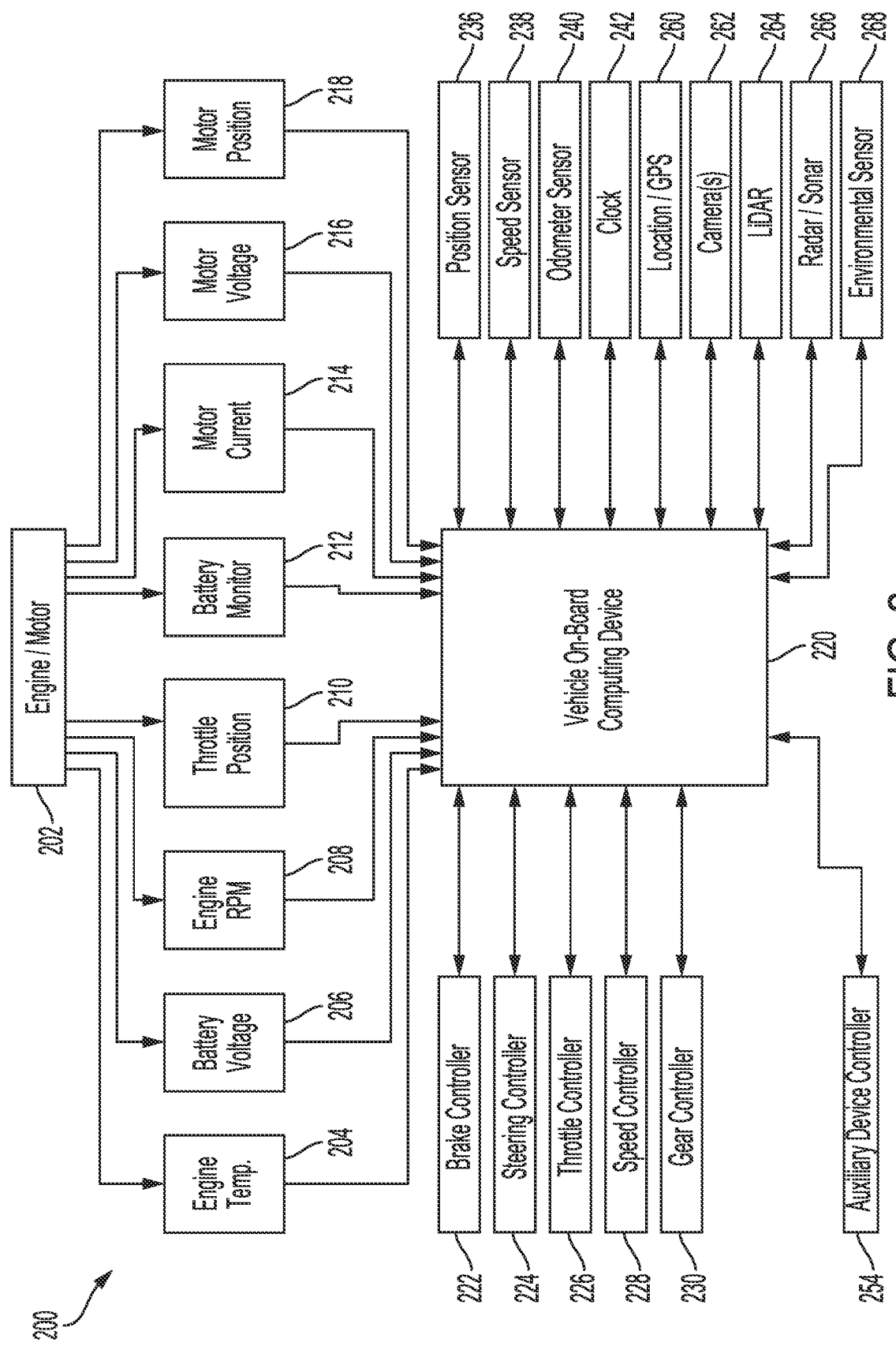
FIG. 2 is an illustration of an illustrative architecture for a vehicle.

Referring now to FIG. 2, FIG. 2 is an illustration of an illustrative system architecture 200 for a vehicle. Autonomous vehicle 102 may include a same or similar system architecture as that of system architecture 200 shown in FIG. 2.

As shown in FIG. 2, system architecture 200 may include engine or motor 202 and various sensors 204-218 for measuring various parameters of the vehicle. In gas-powered or hybrid vehicles having a fuel-powered engine, the sensors may include, for example, engine temperature sensor 204, battery voltage sensor 206, engine Rotations Per Minute ("RPM") sensor 208, and/or throttle position sensor 210. In an electric or hybrid vehicle, the vehicle may have an electric motor, and may have sensors such as battery monitoring sensor 212 (e.g., to measure current, voltage, and/or temperature of the battery), motor current sensor 214, motor voltage sensor 216, and/or motor position sensors 218, such as resolvers and encoders.

System architecture 200 may include operational parameter sensors, which may be common to both types of vehicles, and may include, for example: position sensor 236 such as an accelerometer, gyroscope and/or inertial measurement unit; speed sensor 238; and/or odometer sensor 240. System architecture 200 may include clock 242 that the system 200 uses to determine vehicle time during operation. Clock 242 may be encoded into the vehicle on-board computing device 220, it may be a separate device, or multiple clocks may be available.

System architecture 200 may include various sensors that operate to gather information about an environment in which the vehicle is operating and/or traveling. These sensors may include, for example: location sensor 260 (e.g., a Global Positioning System ("GPS") device); object detection sensors such as one or more cameras 262; LiDAR sensor system 264; and/or radar and/or sonar system 266. The sensors may include environmental sensors 268 such as a precipitation sensor and/or ambient temperature sensor. The object detection sensors may enable the system architecture 200 to detect objects that are within a given distance range of the vehicle in any direction, and the environmental sensors 268 may collect data about environmental conditions within an area of operation and/or travel of the vehicle.

During operation of system architecture 200, information is communicated from the sensors of system architecture 200 to on-board computing device 220. On-board computing device 220 analyzes the data captured by the sensors and optionally controls operations of the vehicle based on results of the analysis. For example, on-board computing device 220 may control: braking via a brake controller 222; direction via steering controller 224; speed and acceleration via throttle controller 226 (e.g., in a gas-powered vehicle) or motor speed controller 228 such as a current level controller (e.g., in an electric vehicle); differential gear controller 230 (e.g., in vehicles with transmissions); and/or other controllers such as auxiliary device controller 254.

Geographic location information may be communicated from location sensor 260 to on-board computing device 220, which may access a map of the environment including map data that corresponds to the location information to determine known fixed features of the environment such as streets, buildings, stop signs and/or stop/go signals. Captured images and/or video from cameras 262 and/or object detection information captured from sensors such as LiDAR 264 is communicated from those sensors to on-board computing device 220. The object detection information and/or captured images are processed by on-board computing device 220 to detect objects in proximity to the vehicle. Any known or to be known technique for making an object detection based on sensor data and/or captured images can be used in the embodiments disclosed in this document.

Figure 3:
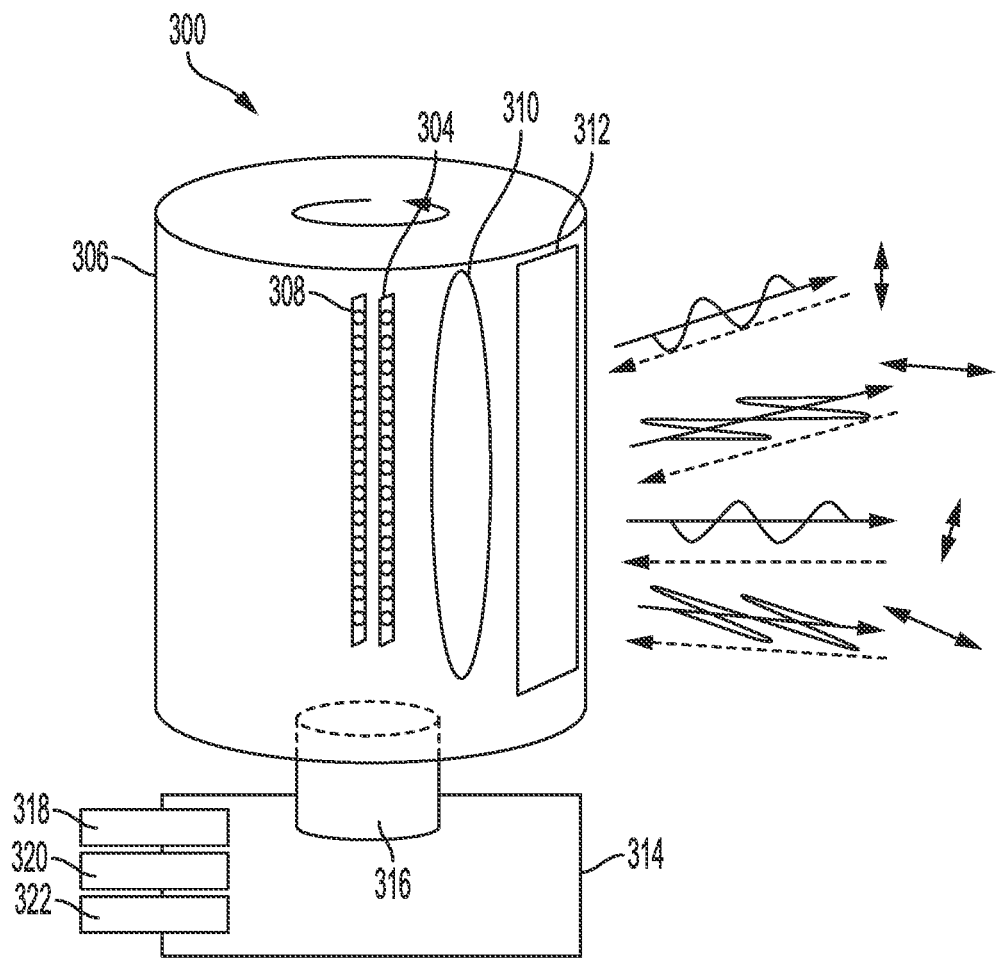
FIG. 3 is an illustration of an illustrative architecture for a LiDAR system.

Referring now to FIG. 3, FIG. 3 is an illustration of an illustrative LiDAR system 300. LiDAR system 264 of FIG. 2 may be the same as or substantially similar to LiDAR system 300.

As shown in FIG. 3, LiDAR system 300 may include housing 306, which may be rotatable 360° about a central axis such as hub or axle 316. Housing 306 may include an emitter/receiver aperture 312 made of a material transparent to light. Although a single aperture is shown in FIG. 3, non-limiting embodiments or aspects of the present disclosure are not limited in this regard. In other scenarios, multiple apertures for emitting and/or receiving light may be provided. Either way, LiDAR system 300 can emit light through one or more of aperture(s) 312 and receive reflected light back toward one or more of aperture(s) 312 as housing 306 rotates around the internal components. In an alternative scenario, the outer shell of housing 306 may be a stationary dome, at least partially made of a material that is transparent to light, with rotatable components inside of housing 306.

Inside the rotating shell or stationary dome is a light emitter system 304 that is configured and positioned to generate and emit pulses of light through aperture 312 or through the transparent dome of housing 306 via one or more laser emitter chips or other light emitting devices. Emitter system 304 may include any number of individual emitters (e.g., 8 emitters, 64 emitters, 128 emitters, etc.). The emitters may emit light of substantially the same intensity or of varying intensities. The individual beams emitted by light emitter system 304 may have a well-defined state of polarization that is not the same across the entire array. As an example, some beams may have vertical polarization and other beams may have horizontal polarization. LiDAR system 300 may include light detector 308 containing a photodetector or array of photodetectors positioned and configured to receive light reflected back into the system. Emitter system 304 and light detector 308 may rotate with the rotating shell, or emitter system 304 and light detector 308 may rotate inside the stationary dome of housing 306. One or more optical element structures 310 may be positioned in front of light emitting unit 304 and/or light detector 308 to serve as one or more lenses and/or waveplates that focus and direct light that is passed through optical element structure 310.

One or more optical element structures 310 may be positioned in front of a mirror to focus and direct light that is passed through optical element structure 310. As described herein below, LiDAR system 300 may include optical element structure 310 positioned in front of a mirror and connected to the rotating elements of LiDAR system 300 so that optical element structure 310 rotates with the mirror. Alternatively or in addition, optical element structure 310 may include multiple such structures (e.g., lenses, waveplates, etc.). In some non-limiting embodiments or aspects, multiple optical element structures 310 may be arranged in an array on or integral with the shell portion of housing 306.

In some non-limiting embodiments or aspects, each optical element structure 310 may include a beam splitter that separates light that the system receives from light that the system generates. The beam splitter may include, for example, a quarter-wave or half-wave waveplate to perform the separation and ensure that received light is directed to the receiver unit rather than to the emitter system (which could occur without such a waveplate as the emitted light and received light should exhibit the same or similar polarizations).

LiDAR system 300 may include power unit 318 to power the light emitting unit 304, motor 316, and electronic components. LiDAR system 300 may include an analyzer 314 with elements such as processor 322 and non-transitory computer-readable memory 320 containing programming instructions that are configured to enable the system to receive data collected by the light detector unit, analyze the data to measure characteristics of the light received, and generate information that a connected system can use to make decisions about operating in an environment from which the data was collected. Analyzer 314 may be integral with the LiDAR system 300 as shown, or some or all of analyzer 314 may be external to LiDAR system 300 and communicatively connected to LiDAR system 300 via a wired and/or wireless communication network or link.

Figure 4:
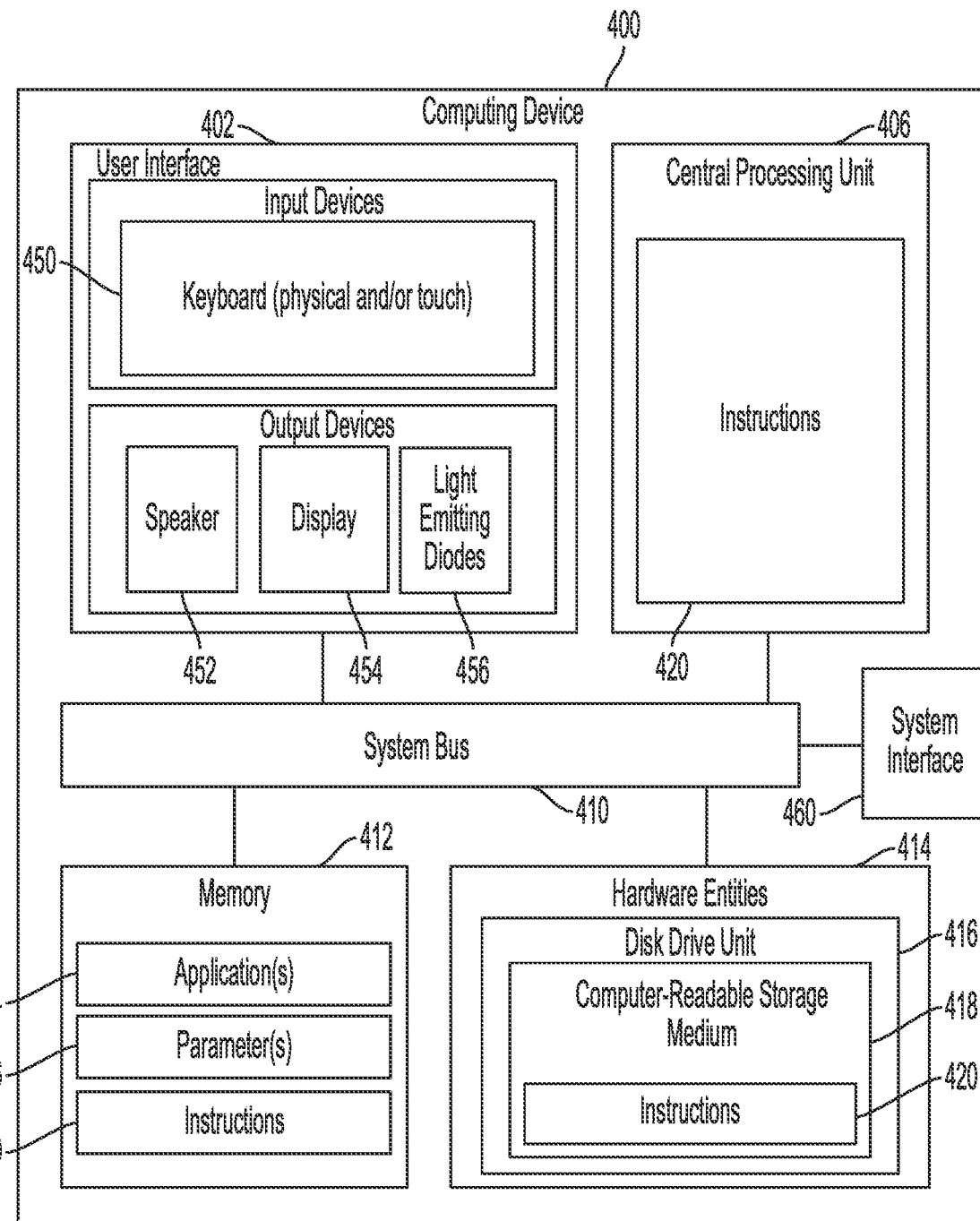
FIG. 4 is an illustration of an illustrative computing device.

Referring now to FIG. 4, FIG. 4 is an illustration of an illustrative architecture for a computing device 400. Computing device 400 can correspond to one or more devices of (e.g., one or more devices of a system of) autonomous vehicle 102 (e.g., one more devices of system architecture 200, etc.) and/or one or more devices of remote guidance system 104. In some non-limiting embodiments or aspects, one or more devices of (e.g., one or more devices of a system of) autonomous vehicle 102 (e.g., one or more devices of system architecture 200, etc.) and/or one or more devices of remote guidance system 104 can include at least one computing device 400 and/or at least one component of computing device 400.

The number and arrangement of components shown in FIG. 4 are provided as an example. In some non-limiting embodiments or aspects, computing device 400 may include additional components, fewer components, different components, or differently arranged components than those shown in FIG. 4. Additionally, or alternatively, a set of components (e.g., one or more components) of computing device 400 may perform one or more functions described as being performed by another set of components of device 400.

As shown in FIG. 4, computing device 400 comprises user interface 402, Central Processing Unit ("CPU") 406, system bus 410, memory 412 connected to and accessible by other portions of computing device 400 through system bus 410, system interface 460, and hardware entities 414 connected to system bus 410. User interface 402 can include input devices and output devices, which facilitate user-software interactions for controlling operations of the computing device 400. The input devices may include, but are not limited to, physical and/or touch keyboard 450. The input devices can be connected to computing device 400 via a wired and/or wireless connection (e.g., a Bluetooth® connection). The output devices may include, but are not limited to, speaker 452, display 454, and/or light emitting diodes 456. System interface 460 is configured to facilitate wired and/or wireless communications to and from external devices (e.g., network nodes such as access points, etc.).

At least some of hardware entities 414 may perform actions involving access to and use of memory 412, which can be a Random Access Memory ("RAM"), a disk drive, flash memory, a Compact Disc Read Only Memory ("CD-ROM") and/or another hardware device that is capable of storing instructions and data. Hardware entities 414 can include disk drive unit 416 comprising computer-readable storage medium 418 on which is stored one or more sets of instructions 420 (e.g., software code) configured to implement one or more of the methodologies, procedures, or functions described herein. Instructions 420, applications 424, and/or parameters 426 can also reside, completely or at least partially, within memory 412 and/or within CPU 406 during execution and/or use thereof by computing device 400. Memory 412 and CPU 406 may include machine-readable media. The term "machine-readable media", as used here, may refer to a single medium or multiple media (e.g., a centralized or distributed database, and/or associated caches and server) that store the one or more sets of instructions 420. The term "machine readable media", as used here, may refer to any medium that is capable of storing, encoding or carrying a set of instructions 420 for execution by computing device 400 and that cause computing device 400 to perform any one or more of the methodologies of the present disclosure.

Figure 5:
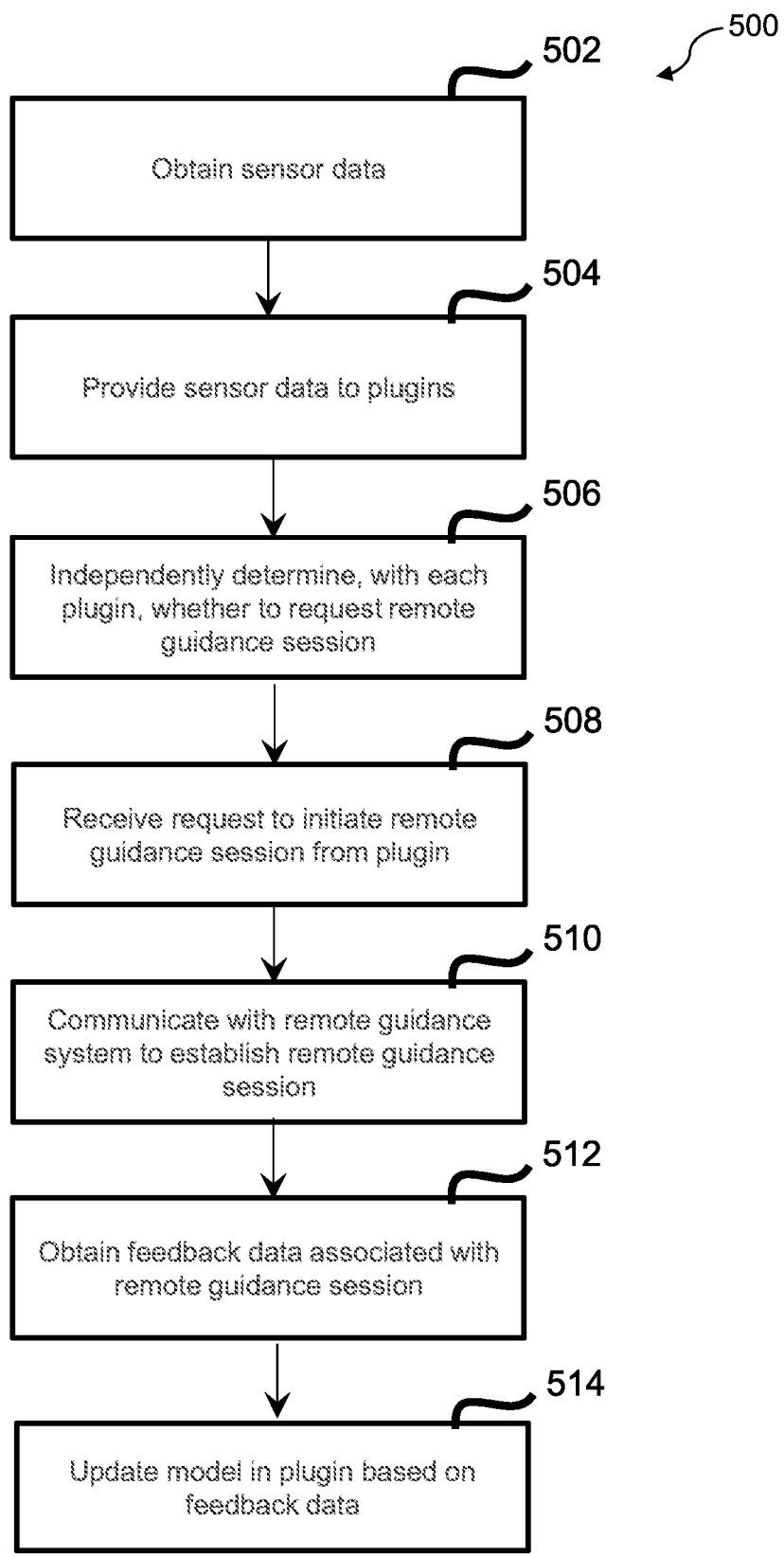
FIG. 5 is a flowchart of non-limiting embodiments or aspects of a modular and continually learning remote guidance process for autonomous vehicles.

Referring now to FIG. 5, FIG. 5 is a flowchart of non-limiting embodiments or aspects of a modular and continually learning remote guidance process 500 for autonomous vehicles. In some non-limiting embodiments or aspects, one or more of the steps of process 500 may be performed (e.g., completely, partially, etc.) by autonomous vehicle 102 (e.g., system architecture 200, remote guidance classification orchestrator 602, plugins 604a-604n, etc.). In some non-limiting embodiments or aspects, one or more of the steps of process 500 may be performed (e.g., completely, partially, etc.) by another device or a group of devices separate from or including autonomous vehicle 102 (e.g., system architecture 200, remote guidance classification orchestrator 602, plugins 604a-604n, etc.), such as remote guidance system 104 (e.g., one or more devices of remote guidance system 104, etc.).

As shown in FIG. 5, at step 502, process 500 includes obtaining sensor data. For example, autonomous vehicle 102 (e.g., system architecture 200, remote guidance classification orchestrator 602, etc.) may obtain sensor data associated with an environment surrounding autonomous vehicle 102. As an example, autonomous vehicle 102 (e.g., LiDAR system 300, camera 262, etc.) may determine sensor data associated with an environment surrounding autonomous vehicle 102. In such an example, sensor data may include data that describes a location and/or a state of objects within the surrounding environment of autonomous vehicle 102 and/or a location and/or a state of autonomous vehicle 102. In some non-limiting embodiments or aspects, sensor data may include sensor data that has been processed by one or more components of system architecture 200 (e.g., data associated with a predicted location and/or state of objects within the surrounding environment of autonomous vehicle 102, etc.). In some non-limiting embodiments or aspects, sensor data may include map data and/or sensor data that has been processed with map data. In some non-limiting embodiments or aspects, sensor data may include an internal state of autonomy code or processes providing autonomous control autonomous vehicle 102 (e.g., a detection that a certain software component is experiencing an anomaly or processing inconsistency or has experienced an anomaly or processing inconsistency may automatically trigger remote guidance directly based on the detection that the software component is experiencing an anomaly or processing inconsistency or has experienced an anomaly or processing inconsistency, etc.).

Figure 6:
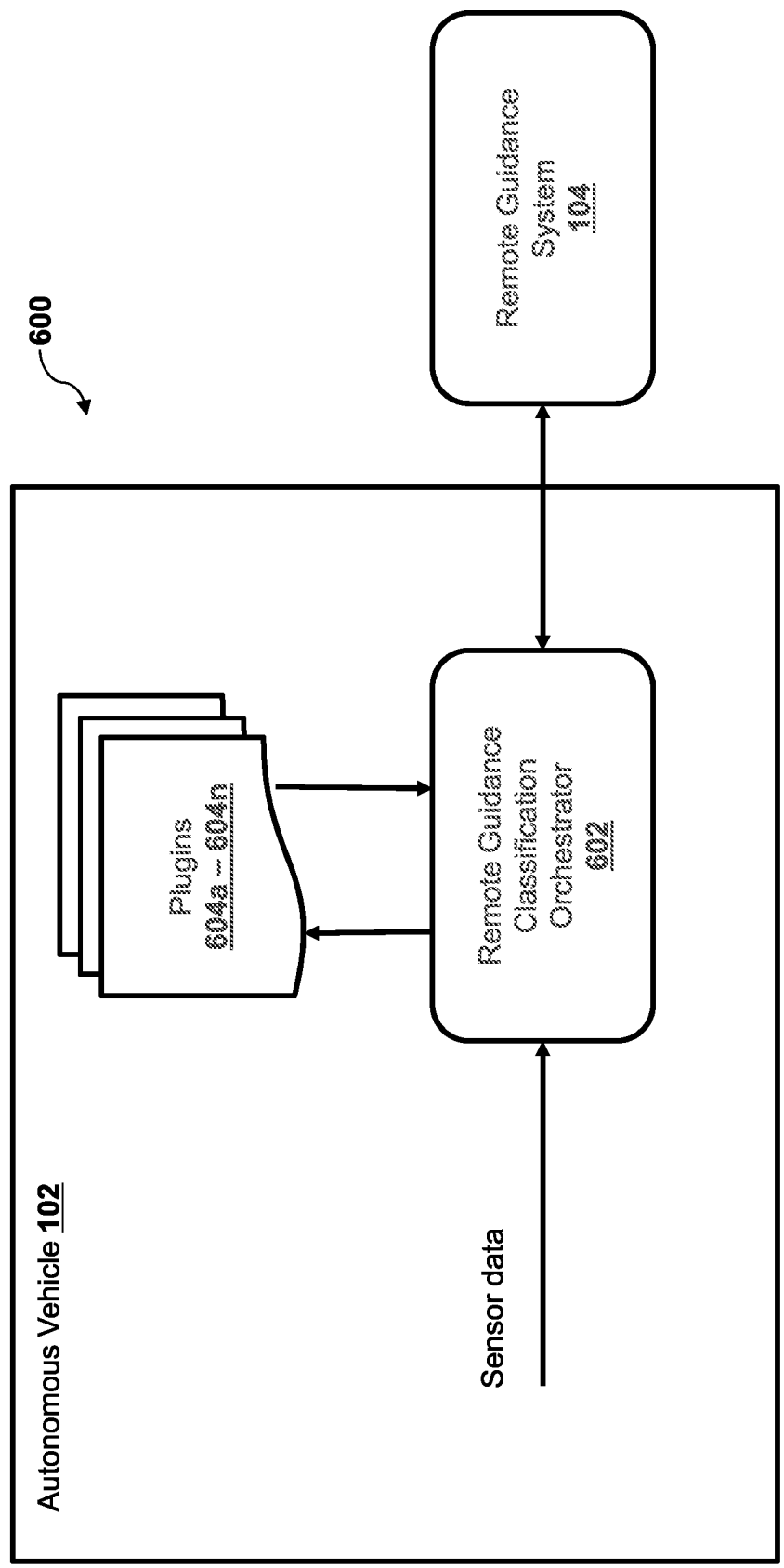
FIG. 6 is a diagram illustrating components of a modular and continually learning remote guidance system for autonomous vehicles.

Referring also to FIG. 6, FIG. 6 is a diagram illustrating components of a modular and continually learning remote guidance system 600 for autonomous vehicles. Autonomous vehicle 102 (e.g., system architecture 200, etc.) may include a same or similar system as that of system 600 shown in FIG. 6.

As shown in FIG. 6, a modular and continually learning remote guidance system 600 may include remote guidance classification orchestrator 602 and a plurality of plugins 604a-604n. The modular and continually learning remote guidance system 600 (e.g., remote guidance classification orchestrator 602, etc.) may be configured to receive and/or provide sensor data to the plurality of plugins 604a-604n for determining when to trigger and/or initiate a call to remote guidance and/or to trigger or initiate the call to remote guidance (e.g., to establish a remote guidance session between autonomous vehicle 102 and remote guidance system 104, etc.).

Autonomous vehicle 102 (e.g., system architecture 200, remote guidance classification orchestrator 602, etc.) may communicate information associated with an environment surrounding autonomous vehicle 102 (e.g., a current representation of that environment, etc.) to remote guidance system 104 upon initiation of and/or during a remote guidance session between autonomous vehicle 102 and remote guidance system 104. For example, the information may include at least a subset of the sensor data collected by autonomous vehicle 102 from its surrounding environment. For example, a live video stream from one or more video cameras and/or still photos may be communicated from autonomous vehicle 102 to remote guidance system 104 and displayed by remote guidance system 104 to a human operator. As an example, the human operator and remote guidance system 104 may be located in a remote location external to and separated from autonomous vehicle 102 that has a wireless connection with a communication system of the autonomous vehicle 102. In such an example, the human operator may be located at a remote computer terminal (e.g., remote guidance system 104, etc.) with a user interface that provides information from autonomous vehicle 102 and the human operator an ability to control at least one driving operation of autonomous vehicle 102 via the remote computer terminal.

In some non-limiting embodiments or aspects, autonomous vehicle 102 (e.g., system architecture 200, remote guidance classification orchestrator 602, etc.) may receive, from remote guidance system 104, during a remote guidance session, remote guidance data (e.g., a command to perform one or more driving operations, etc.), and control, based on the remote guidance data, during the remote guidance session, at least one driving operation of autonomous vehicle 102. For example, control of a driving operation (e.g., either fully autonomous control or control via remote guidance) may include controlling travel of autonomous vehicle 102 on a roadway, including operations such as changing a direction of autonomous vehicle 102, changing a speed of autonomous vehicle 102, instructing autonomous vehicle 102 to perform one or more predetermined maneuvers, keeping autonomous vehicle 102 stationary or non-moving, and/or the like. As an example, in response to receiving the remote guidance data, autonomous vehicle 102 (e.g., system architecture 200, remote guidance classification orchestrator 602, etc.) may override (and/or supplement) the vehicle's autonomous system and control the at least one driving operation of autonomous vehicle 102 on the remote guidance data (e.g., based on a command therein, etc.).

As shown in FIG. 5, at step 504, process 500 includes providing sensor data to plugins. For example, autonomous vehicle 102 (e.g., remote guidance classification orchestrator 602, etc.) may provide the sensor data to a plurality of plugins 604a-604n. As an example, autonomous vehicle 102 may include an independent monitoring subsystem (e.g., remote guidance classification orchestrator 602, etc.) that listens to or receives onboard communications (e.g., sensor data, processed sensor data, map data, etc.) and delegates a decision to call remote guidance (e.g., remote guidance system 104, etc.) to an ensemble of independent plugins (e.g., the plurality of plugins 604a-604n, etc.).

Each plugin of the plurality of plugins 604a-604n may include a different model that may be applied by that plugin to sensor data to determine whether to request a remote guidance session for autonomous vehicle 102. For example, a first plugin of the plurality of plugins 604a-604n may include a first model, a second plugin of the plurality of plugins 604a-604n may include a second model, and the first model may be different than the second model. As an example, a model may receive a different type and/or amount of sensor data than another model, apply a different type of model than another model, and/or apply a differently structured and/or trained model than another model. In such an example, different models may be configured to determine an existence of different autonomy anomalies for which a remote guidance session should be requested.

In some non-limiting embodiments or aspects, a model may include at least one of the following models: a threshold model, a heuristic model, a machine learning model, a neural network model, or any combination thereof. For example, an example heuristic model may monitor a forecast L2 error (e.g., a Least Square Errors loss function, a displacement error of an object's predicted trajectory, etc.) for each object in a scene surrounding autonomous vehicle 102, and if an L2 error of an object satisfies a threshold value, and the object is determined to be on a current path of autonomous vehicle 102 and within a certain radius of autonomous vehicle 102, the heuristic model may determine to request a remote guidance session for autonomous vehicle 102. As an example, an example data-driven model, such as a linear regression model, may predict an L2 error for each object in a scene surrounding autonomous vehicle 102 from an inferred state of the object, and if the predicted L2 error for the object satisfies a threshold value, and the object is determined to be on a current path of autonomous vehicle 102 and within a certain radius of autonomous vehicle 102, the data-driven model may determine to request a remote guidance session for autonomous vehicle 102.

In some non-limiting embodiments or aspects, a model (e.g., an estimator, a classifier, a prediction model, a detector model, etc.) may be generated using a machine learning technique including, for example, supervised and/or unsupervised techniques, such as decision trees (e.g., gradient boosted decision trees, random forests, etc.), logistic regressions, artificial neural networks (e.g., convolutional neural networks, etc.), Bayesian statistics, learning automata, Hidden Markov Modeling, linear classifiers, quadratic classifiers, association rule learning, and/or the like. The machine learning model may be trained to provide an output (e.g., a prediction, a classification, etc.) indicating whether or not to request a remote guidance session for autonomous vehicle 102 (e.g., indicating whether or not an autonomy anomaly associated with that model and for which a remote guidance session should be requested exists, etc.). In some non-limiting embodiments or aspects, the prediction or classification may include a probability score associated with the indication of whether or not to request a remote guidance session for autonomous vehicle 102.

In some non-limiting embodiments or aspects, the model may be generated based on sensor data (e.g., training data, etc.). In some implementations, the model is designed to receive, as an input, sensor data and provide, as an output, a prediction (e.g., a probability, a binary output, a yes-no output, a score, a prediction score, a classification, etc.) as to whether or not to request a remote guidance session for autonomous vehicle 102. In some non-limiting embodiments, autonomous vehicle 102 stores the model (e.g., stores the model for later use).

As shown in FIG. 5, at step 506, process 500 includes independently determining, with each plugin, whether to request a remote guidance session. For example, each plugin of the plurality of plugins 604a-604n may independently determine, based on the sensor data, whether to request a remote guidance session for autonomous vehicle 102. As an example, each plugin of the plurality of plugins 604a-604n may apply a different model to the sensor data to determine whether to request a remote guidance session for autonomous vehicle 102. In such an example, the plurality of plugins 604a-604n may simultaneously process the sensor data to determine whether to request a remote guidance session for autonomous vehicle 102. In such an example, in response to determining to request a remote guidance session for autonomous vehicle 102, a plugin of the plurality of plugins 604a-604n may generate a request to initiate a remote guidance session and/or provide the request to remote guidance classification orchestrator 602.

As shown in FIG. 5, at step 508, process 500 includes receiving a request to initiate a remote guidance session from a plugin. For example, autonomous vehicle 102 (e.g., remote guidance classification orchestrator 602, etc.) may receive, from at least one plugin of the plurality of plugins 604a-604n, a request to initiate the remote guidance session for autonomous vehicle 102.

In some non-limiting embodiments or aspects, remote guidance classification orchestrator 602 may poll the plurality of plugins 604a-604n at a specified frequency to determine if one or more of the plurality of plugins 604a-604n is currently requesting (e.g., has generated a request, etc.) that a remote guidance session be initiated. In some non-limiting embodiments or aspects, a plugin of the plurality of plugins 604a-604n may automatically communicate a request to initiate the remote guidance session for autonomous vehicle 102 to remote guidance classification orchestrator 602 in response to generating the request.

As shown in FIG. 5, at step 510, process 500 includes communicating with a remote guidance system to establish a remote guidance session. For example, autonomous vehicle 102 (e.g., system architecture 200, remote guidance classification orchestrator 602, etc.) may, in response to receiving the request to initiate the remote guidance session from the at least one plugin of the plurality of plugins 604a-604n, communicate with a computing device external to the autonomous vehicle (e.g., with remote guidance system 104, etc.) to establish the remote guidance session with the computing device. As an example, the remote guidance session may provide, via the computing device (e.g., via remote guidance system 104, etc.), a human operator with information associated with the environment surrounding the autonomous vehicle (e.g., sensor data, etc.) and an ability to control at least one driving operation of autonomous vehicle 102.

In some non-limiting embodiments or aspects, a plugin of the plurality of plugins 604a-604n may be associated with an autonomy anomaly case. For example, the plugin may be programmed and/or configured to determine whether the autonomy anomaly case associated with that plugin exists and, in response to determining that the autonomy anomaly case exists, generate a request to initiate a remote guidance session for autonomous vehicle 102. As an example, each plugin of the plurality of plugins 604a-604n may be associated with a different autonomy anomaly case. In such an example, a remote guidance session may provide, via remote computing system 104, a human operator with an indication of the autonomy anomaly case associated with the plugin from which the request to initiate the remote guidance session is received by remote guidance classification orchestrator 602.

An autonomy anomaly case may correspond to a situation and/or environment in which autonomous vehicle 102 (e.g., system architecture 200, etc.) determines that a probability or likelihood of autonomous vehicle 102 responding to the detected situation and/or environment in an acceptable manner (e.g., without violating one or more constraints, etc.) fails to satisfy a threshold probability. Examples of autonomy anomaly cases may include a pedestrian sitting in the middle of the road on which autonomous vehicle 102 is traveling, a difference between an observed scene and previously-observed one(s) that fails to satisfy a threshold difference (e.g., based on embedding the scene in a metric space and measuring the difference), and/or the like. For example, remote guidance may override or preempt autonomous motion planning and/or driving operations by autonomous vehicle 102 by delegating the motion planning and control of driving operations to a human operator.

In some non-limiting embodiments or aspects, a remote guidance session may automatically transfer control of at least one driving operation of autonomous vehicle 102 to a human operator at remote guidance system 102 in response to the remote guidance session being initiated or established between autonomous vehicle 102 and remote guidance system 104. In some non-limiting embodiments or aspects, a remote guidance session may provide an alert to a human operator at remote guidance system 104 to monitor the scene surrounding autonomous vehicle 102 with an option to take over control of at least one driving operation of autonomous vehicle 102 or to allow autonomous vehicle 102 to remain operating in a fully autonomous manner. For example, autonomous vehicle 102 may remain operating in a fully autonomous mode until remote guidance system 104 receives an input during the remote guidance session from the human operator indicating that the human operator is taking over control of at least one driving operation of autonomous vehicle 102.

As shown in FIG. 5, at step 512, process 500 includes obtaining feedback data associated with a remote guidance session. For example, autonomous vehicle 102 (e.g., system architecture 200, remote guidance classification orchestrator 602, etc.) may obtain, from the human operator, via the computing device (e.g., via remote guidance system 104, etc.), feedback data associated with the remote guidance session.

In some non-limiting embodiments or aspects, feedback data may include an indication or label associated with a remote guidance session, and the indication or label may provide an indication of whether the remote guidance session should have been initiated or not (e.g., a "remote guidance needed" label, "a remote guidance not needed" label etc.). For example, the label may provide an indication of whether a request to initiate the remote guidance session is a false positive for the autonomy anomaly associated with the at least one plugin that requested the remote guidance session. As an example, after a remote guidance session is terminated, remote guidance system 104 may prompt the human operator to enter a label for the remote guidance session, and/or remote guidance system 104 may provide autonomous vehicle 102 (e.g., system architecture 200, remote guidance classification orchestrator 602, etc.) with the label for the remote guidance session and/or the sensor data upon which the at least one plugin of the plurality of plugins 604a-604n made the determination to request a remote guidance session. In such an example, the label for the remote guidance session may be associated with the at least one plugin of the plurality of plugins 604a-604n that requested the remote guidance session.

As shown in FIG. 5, at step 514, process 500 includes updating a model in a plugin based on feedback data. For example, autonomous vehicle 102 (e.g., system architecture 200, remote guidance classification orchestrator 602, etc.) may update, based on the feedback data, the model included in the at least one plugin from which the request to initiate the remote guidance session is received. In some non-limiting embodiments or aspects, after updating the model in step 514, processing may return to step 502.

In some non-limiting embodiments or aspects, autonomous vehicle 102 (e.g., system architecture 200, remote guidance classification orchestrator 602, etc.) may update the model included in the at least one plugin from which the request to initiate the remote guidance session is received by retraining the model of the plugin using the label for the remote guidance session triggered or initiated by that plugin and/or the sensor data upon which that plugin decided to request the remote guidance session. For example, an updated model (e.g., an updated machine learning model, an updated neural network, etc.) for the plugin may be generated based on the feedback data.

In some non-limiting embodiments or aspects, a threshold or heuristics associated with a model may be adjusted based on the feedback data. For example, a threshold or heuristics associated with a model may be automatically adjusted in response to the feedback data satisfying one or more other thresholds or heuristics associated with the threshold or heuristics associated with the model (e.g., in response to receiving a threshold number of false positives, etc.). As an example, a threshold or heuristics associated with a model may be adjusted by a developer based on an analysis of the feedback data.

In some non-limiting embodiments or aspects, the at least one plugin from which the request to initiate the remote guidance session is received may include two or more plugins of the plurality of plugins 604a-604n, the feedback data may include first feedback data associated with a first plugin of the two or more plugins and second feedback data associated with a second plugin of the two or more plugins, and autonomous vehicle 102 (e.g., system architecture 200, remote guidance classification orchestrator 602, etc.) may update, based on the first feedback data, a first model included in the first plugin of the two or more plugins and update, based on the second feedback data, a second model included in the second plugin of the two or more plugins. For example, the plurality of plugins 604a-604n may be individually updated based on feedback data, and the feedback data may individually tailored to the individual models.

Although embodiments or aspects have been described in detail for the purpose of illustration and description, it is to be understood that such detail is solely for that purpose and that embodiments or aspects are not limited to the disclosed embodiments or aspects, but, on the contrary, are intended to cover modifications and equivalent arrangements that are within the spirit and scope of the appended claims. For example, it is to be understood that the present disclosure contemplates that, to the extent possible, one or more features of any embodiment or aspect can be combined with one or more features of any other embodiment or aspect. In fact, any of these features can be combined in ways not specifically recited in the claims and/or disclosed in the specification. Although each dependent claim listed below may directly depend on only one claim, the disclosure of possible implementations includes each dependent claim in combination with every other claim in the claim set.

What is claimed is:

1. A computer-implemented method for controlling at least one driving operation of an autonomous vehicle, comprising:
   obtaining sensor data associated with an environment surrounding the autonomous vehicle;
   providing the sensor data to a plurality of plugins, wherein each plugin of the plurality of plugins is configured to determine an existence of a different autonomy anomaly than the other plugins of the plurality of plugins;
   independently determining, with each plugin of the plurality of plugins, based on the sensor data, whether to initiate a remote guidance session for the autonomous vehicle due to the existence of the autonomy anomaly associated with that plugin, wherein each plugin of the plurality of plugins includes a different model that is applied by that plugin to the sensor data to determine whether to request the remote guidance session;
   receiving, from at least one plugin of the plurality of plugins, a request to initiate the remote guidance session for the autonomous vehicle;
   in response to receiving the request to initiate the remote guidance session, automatically communicating with a computing device external to the autonomous vehicle to establish the remote guidance session with the computing device, wherein the remote guidance session provides, via the computing device, a human operator with information associated with the environment surrounding the autonomous vehicle and an ability to control at least one driving operation of the autonomous vehicle;
   receiving, from the computing device external to the autonomous vehicle, during the remote guidance session, remote guidance data; and
   controlling, based on the remote guidance data, during the remote guidance session, the at least one driving operation of the autonomous vehicle.

2. The computer-implemented method of claim 1, further comprising:
   obtaining, from the human operator, via the computing device, feedback data associated with the remote guidance session; and
   updating, based on the feedback data, the model included in the at least one plugin from which the request to initiate the remote guidance session is received.

3. The computer-implemented method of claim 2, wherein the model included in the at least one plugin from which the request to initiate the remote guidance session is received includes at least one of the following models: a threshold model, a heuristic model, a machine learning model, a neural network model, or any combination thereof.

4. The computer-implemented method of claim 2, wherein the at least one plugin from which the request to initiate the remote guidance session is received includes two or more plugins of the plurality of plugins, wherein the feedback data includes first feedback data associated with a first plugin of the two or more plugins and second feedback data associated with a second plugin of the two or more plugins, and wherein the method further comprises:
   updating, based on the first feedback data, a first model included in the first plugin of the two or more plugins; and updating, based on the second feedback data, a second model included in the second plugin of the two or more plugins.

5. The computer-implemented method of claim 1, wherein the remote guidance session provides, via the computing device, the human operator with an indication of an autonomy anomaly case associated with the at least one plugin from which the request to initiate the remote guidance session is received.

6. A system for controlling at least one driving operation of an autonomous vehicle, comprising:
   one or more processors programmed and/or configured to:
   obtain sensor data associated with an environment surrounding the autonomous vehicle;
   provide the sensor data to a plurality of plugins, wherein each plugin of the plurality of plugins is configured to determine an existence of a different autonomy anomaly than the other plugins of the plurality of plugins;
   independently determine, with each plugin of the plurality of plugins, based on the sensor data, whether to initiate a remote guidance session for the autonomous vehicle due to the existence of the autonomy anomaly associated with that plugin, wherein each plugin of the plurality of plugins includes a different model that is applied by that plugin to the sensor data to determine whether to request the remote guidance session;
   receive, from at least one plugin of the plurality of plugins, a request to initiate the remote guidance session for the autonomous vehicle;
   in response to receiving the request to initiate the remote guidance session, automatically communicate with a computing device external to the autonomous vehicle to establish the remote guidance session with the computing device, wherein the remote guidance session provides, via the computing device, a human operator with information associated with the environment surrounding the autonomous vehicle and an ability to control at least one driving operation of the autonomous vehicle;
   receive, from the computing device external to the autonomous vehicle, during the remote guidance session, remote guidance data; and
   control, based on the remote guidance data, during the remote guidance session, the at least one driving operation of the autonomous vehicle.

7. The system of claim 6, wherein the one or more processors are further programmed and/or configured to:
   obtain, from the human operator, via the computing device, feedback data associated with the remote guidance session; and
   update, based on the feedback data, the model included in the at least one plugin from which the request to initiate the remote guidance session is received.

8. The system of claim 7, wherein the model included in the at least one plugin from which the request to initiate the remote guidance session is received includes at least one of the following models: a threshold model, a heuristic model, a machine learning model, a neural network model, or any combination thereof.

9. The system of claim 7, wherein the at least one plugin from which the request to initiate the remote guidance session is received includes two or more plugins of the plurality of plugins, wherein the feedback data includes first feedback data associated with a first plugin of the two or more plugins and second feedback data associated with a second plugin of the two or more plugins, and wherein the one or more processors are further programmed and/or configured to:
   update, based on the first feedback data, a first model included in the first plugin of the two or more plugins; and
   update, based on the second feedback data, a second model included in the second plugin of the two or more plugins.

10. The system of claim 6, wherein the remote guidance session provides, via the computing device, the human operator with an indication of an autonomy anomaly case associated with the at least one plugin from which the request to initiate the remote guidance session is received.

11. The system of claim 6, further comprising:
    the computing device external to the autonomous vehicle, wherein the computing device external to the autonomous vehicle is programmed and/or configured to:
    provide a user interface that provides the information associated with the environment surrounding the autonomous vehicle and the ability to control at least one driving operation of the autonomous vehicle.

12. An autonomous vehicle comprising:
    one or more sensors configured to determine sensor data associated with an environment surrounding the autonomous vehicle;
    a computing device programmed and/or configured to:
    obtain the sensor data associated with the environment surrounding an autonomous vehicle;
    provide the sensor data to a plurality of plugins, wherein each plugin of the plurality of plugins is configured to determine an existence of a different autonomy anomaly than the other plugins of the plurality of plugins;
    independently determine, with each plugin of the plurality of plugins, based on the sensor data, whether to initiate a remote guidance session for the autonomous vehicle due to the existence of the autonomy anomaly associated with that plugin, wherein each plugin of the plurality of plugins includes a different model that is applied by that plugin to the sensor data to determine whether to request the remote guidance session;
    receive, from at least one plugin of the plurality of plugins, a request to initiate the remote guidance session for the autonomous vehicle;
    in response to receiving the request to initiate the remote guidance session, automatically communicate with a computing device external to the autonomous vehicle to establish the remote guidance session with the computing device, wherein the remote guidance session provides, via the computing device, a human operator with information associated with the environment surrounding the autonomous vehicle and an ability to control at least one driving operation of the autonomous vehicle;
    receive, from the computing device external to the autonomous vehicle, during the remote guidance session, remote guidance data; and
    control, based on the remote guidance data, during the remote guidance session, the at least one driving operation of the autonomous vehicle.

13. The autonomous vehicle of claim 12, wherein the computing system is further programmed and/or configured to:
    obtain, from the human operator, via the computing device, feedback data associated with the remote guidance session; and update, based on the feedback data, the model included in the at least one plugin from which the request to initiate the remote guidance session is received.

14. The autonomous vehicle of claim 13, wherein the model included in the at least one plugin from which the request to initiate the remote guidance session is received includes at least one of the following models: a threshold model, a heuristic model, a machine learning model, a neural network model, or any combination thereof.

15. The autonomous vehicle of claim 13, wherein the at least one plugin from which the request to initiate the remote guidance session is received includes two or more plugins of the plurality of plugins, wherein the feedback data includes first feedback data associated with a first plugin of the two or more plugins and second feedback data associated with a second plugin of the two or more plugins, and wherein the computing system is further programmed and/or configured to:
- update, based on the first feedback data, a first model included in the first plugin of the two or more plugins; and
- update, based on the second feedback data, a second model included in the second plugin of the two or more plugins.

16. The autonomous vehicle of claim 12, wherein the remote guidance session provides, via the computing device, the human operator with an indication of an autonomy anomaly case associated with the at least one plugin from which the request to initiate the remote guidance session is received.

* * * * *